US011244300B2

(12) United States Patent
Wang et al.

(10) Patent No.: US 11,244,300 B2
(45) Date of Patent: Feb. 8, 2022

(54) SYSTEM, METHOD, AND APPARATUS FOR CONDUCTING A SECURE TRANSACTION USING A REMOTE POINT-OF-SALE SYSTEM

(71) Applicant: Visa International Service Association, San Francisco, CA (US)

(72) Inventors: Quan Wang, Foster City, CA (US); Yuexi Chen, Foster City, CA (US); Shiv Bhatt, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 79 days.

(21) Appl. No.: 16/606,014

(22) PCT Filed: Apr. 19, 2017

(86) PCT No.: PCT/US2017/028330
§ 371 (c)(1),
(2) Date: Oct. 17, 2019

(87) PCT Pub. No.: WO2018/194581
PCT Pub. Date: Oct. 25, 2018

(65) Prior Publication Data
US 2020/0042972 A1 Feb. 6, 2020

(51) Int. Cl.
*G06Q 20/32* (2012.01)
*G06Q 20/12* (2012.01)
(Continued)

(52) U.S. Cl.
CPC .......... *G06Q 20/322* (2013.01); *G06Q 20/12* (2013.01); *G06Q 20/20* (2013.01); *G06Q 20/36* (2013.01); *G06Q 20/385* (2013.01)

(58) Field of Classification Search
None
See application file for complete search history.

(56) References Cited

U.S. PATENT DOCUMENTS 9,727,862 B2 * 8/2017 O'Connell ......... G06Q 20/3821
10,817,875 B2 * 10/2020 Makhotin .......... G06Q 20/3823
(Continued)

FOREIGN PATENT DOCUMENTS

| CA | 2950530 A1 * | 6/2018 | ......... G06Q 30/0185 |
| EP | 2016018895 A1 | 2/2016 | |
| EP | 3136326 A1 | 3/2017 | |

OTHER PUBLICATIONS

Roemmele, "Amazon Go Ends Checkout Lines And Shoplifting, Begins A New Era In Retail", Quora, Dec. 2016. (Year: 2016).*
(Continued)

*Primary Examiner* — Abdulmajeed Aziz
(74) *Attorney, Agent, or Firm* — The Webb Law Firm

(57) ABSTRACT

Provided is a computer-implemented method for conducting a secure payment transaction for a purchase at a merchant using a client device and a remote point-of-sale (POS) system associated with the merchant. The method includes receiving, with a client device, at least one identifier for at least one product to be purchased, the at least one product associated with a transaction value, and detecting a checkout action with the client device. In response to detecting the checkout action, the method includes generating at least one transaction message based on the transaction value of the at least one item to be purchased and at least one account identifier, generating a cryptogram based at least partially on the at least one transaction message and the at least one issuer key, and transmitting the cryptogram to the remote POS system associated with the merchant. A system and computer program product are also disclosed.

9 Claims, 8 Drawing Sheets

(51) Int. Cl.
    *G06Q 20/20*     (2012.01)
    *G06Q 20/36*     (2012.01)
    *G06Q 20/38*     (2012.01)

(56) References Cited

U.S. PATENT DOCUMENTS

| | | | |
|---|---|---|---|
| 2002/0170961 A1* | 11/2002 | Dickson | G06Q 30/02 |
| | | | 235/383 |
| 2002/0186133 A1* | 12/2002 | Loof | G06Q 20/20 |
| | | | 340/572.1 |
| 2012/0041845 A1* | 2/2012 | Rothschild | G06Q 30/0635 |
| | | | 705/26.81 |
| 2012/0271712 A1* | 10/2012 | Katzin | G06Q 20/20 |
| | | | 705/14.51 |
| 2013/0151358 A1* | 6/2013 | Ramalingam | G06Q 20/322 |
| | | | 705/16 |
| 2014/0074635 A1* | 3/2014 | Reese | G06Q 20/401 |
| | | | 705/21 |
| 2016/0063496 A1 | 3/2016 | Royyuru et al. | |
| 2018/0165670 A1* | 6/2018 | Bacallao | G07G 1/0036 |
| 2019/0057435 A1* | 2/2019 | Chomley | B62B 3/14 |

OTHER PUBLICATIONS

EMV Integrated Circuit Card Specifications for Payment Systems, "Book 2 Security and Key Management", Version 4.2, Jun. 2008, 177 pages.
Anonymous: "Transport Layer Security—Wikipedia", Sep. 30, 2014 (Sep. 30, 2014), XP055567139, Retrieved from the Internet: URL:https://en.wikipedia.org/w/index.php?title=Transport_Layer_Security&oldid=627620272, 24 pages, [retrieved on Mar. 11, 2019].

* cited by examiner

SYSTEM, METHOD, AND APPARATUS FOR CONDUCTING A SECURE TRANSACTION USING A REMOTE POINT-OF-SALE SYSTEM

CROSS-REFERENCE TO RELATED APPLICATION

This application is the United States national phase of International Application No. PCT/US2017/028330 filed Apr. 19, 2017, the disclosure of which is hereby incorporated in its entirety by reference.

BACKGROUND

1. Technical Field

This disclosure relates generally to secure transaction systems and, in some non-limiting embodiments, to systems, methods, and apparatus for conducting a secure payment transaction using a remote point-of-sale system.

2. Technical Considerations

A "Card-Present" payment transaction is a secure payment transaction in which the merchant point-of-sale (POS) system and the issuer institution can verify the transaction. In a Card-Present transaction, a portable financial device holds issuer key(s) used to verify the transaction. For example, a Card-Present transaction may require a credit card with a security chip or a contactless payment device to be present at the merchant POS. Accordingly, brick-and-mortar retail stores with physical POS systems are able to conduct Card-Present transactions.

A "Card-Not-Present" transaction is a payment transaction in which the transaction information is not signed and one or more issuer keys are not present. A Card-Not-Present transaction is less secure than a Card-Present transaction and may use a different form of authentication, such as credentials (e.g., a user name and password), an SMS message dynamic code that is inputted, an account identifier with an expiration date and security code, transport layer security (TLS) for encryption, and the like.

A Card-Present transaction is more secure and less prone to fraud than a Card-Not-Present transaction, and is therefore the preferred type of transaction. To conduct a secure Card-Present transaction, a merchant has a physical POS system at the merchant's store for customers to check out. With such arrangements, a customer must physically approach and interact with a POS system and cannot purchase selected items by simply walking out of the store. Moreover, networked devices (e.g., "Internet-of-Things" devices, such as smart televisions, refrigerators, vehicles, and other network-equipped appliances) are unable to conduct Card-Present transactions because there is no physical POS system with which to conduct the transaction.

SUMMARY

Accordingly, provided are improved systems, methods, and apparatus for conducting a secure payment transaction that overcomes some or all of the deficiencies of the prior art.

According to some non-limiting embodiments, provided is a computer-implemented method for conducting a secure payment transaction for a purchase at a merchant using a client device and a remote point-of-sale (POS) system associated with the merchant, the client device comprising at least one account identifier associated with at least one issuer institution and at least one issuer key associated with the at least one issuer institution, comprising: receiving, with a client device, at least one identifier for at least one product to be purchased, the at least one product associated with a transaction value; detecting a checkout action with the client device; in response to detecting the checkout action, generating, with the client device, at least one transaction message based at least partially on the transaction value of the at least one product to be purchased and the at least one account identifier; generating, with the client device, a cryptogram based at least partially on the at least one transaction message and the at least one issuer key; and transmitting, with the client device, the cryptogram to the remote POS system associated with the merchant.

According to some non-limiting embodiments, provided is a system for conducting a secure payment transaction for a purchase at a merchant using a client device and a remote point-of-sale (POS) system associated with the merchant, the client device comprising at least one account identifier associated with at least one issuer institution and at least one issuer key associated with the at least one issuer institution, comprising: a client device comprising at least one processor, the client device programmed or configured to: receive at least one identifier for at least one product to be purchased, the at least one product associated with a transaction value; detect a checkout action; in response to detecting the checkout action, generate at least one transaction message based on the transaction value of the at least one product to be purchased and the at least one account identifier; generate a cryptogram based at least partially on the at least one transaction message and the at least one issuer key; and transmit the cryptogram to the remote POS system associated with the merchant.

According to some non-limiting embodiments, provided is a computer program product for conducting a secure payment transaction for a purchase at a merchant using a client device and a remote point-of-sale (POS) system associated with the merchant, the client device comprising at least one account identifier associated with at least one issuer institution and at least one issuer key associated with the at least one issuer institution, comprising at least one non-transitory computer-readable medium comprising program instructions that, when executed by at least one processor of the client device, cause the client device to: receive at least one identifier for at least one product to be purchased, the at least one product associated with a transaction value; detect a checkout action; in response to detecting the checkout action, generate at least one transaction message based on the transaction value of the at least one product to be purchased and the at least one account identifier; generate a cryptogram based at least partially on the at least one transaction message and the at least one issuer key; and transmit the cryptogram to the remote POS system associated with the merchant.

Further non-limiting embodiments or aspects are set forth in the following numbered clauses:

Clause 1: A computer-implemented method for conducting a secure payment transaction for a purchase at a merchant using a client device and a remote point-of-sale (POS) system associated with the merchant, the client device comprising at least one account identifier associated with at least one issuer institution and at least one issuer key associated with the at least one issuer institution, comprising: receiving, with a client device, at least one identifier for at least one product to be purchased, the at least one product associated with a transaction value; detecting a checkout action with the client device; in response to detecting the checkout action, generating, with the client device, at least one transaction message based at least partially on the transaction value of the at least one product to be purchased and the at least one account identifier; generating, with the client device, a cryptogram based at least partially on the at least one transaction message and the at least one issuer key; and transmitting, with the client device, the cryptogram to the remote POS system associated with the merchant.

Clause 2: The computer-implemented method of clause 1, wherein the client device comprises at least one of the following: a mobile device executing an electronic wallet application, a smart shopping cart system, a smart appliance, or any combination thereof.

Clause 3: The computer-implemented method of clause 1 or 2, wherein the client device comprises the smart shopping cart system and the mobile device, the smart shopping cart system comprising at least one input device and at least one processor, the method further comprising pairing the smart shopping cart device with the mobile device.

Clause 4: The computer-implemented method of any of clauses 1-3, further comprising: scanning, with the at least one input device, a data source associated with the at least one product; and determining the at least one identifier for the at least one product to be purchased from the data source.

Clause 5: The computer-implemented method of any of clauses 1-4, wherein the remote POS system comprises a virtual POS system hosted in a network environment.

Clause 6: The computer-implemented method of any of clauses 1-5, wherein the checkout action comprises at least one of the following: exiting a geographic boundary, passing a sensor, selecting a checkout option in a mobile application, or any combination thereof.

Clause 7: The computer-implemented method of any of clauses 1-6, wherein the issuer key comprises at least one of a symmetric secret key and an asymmetric secret key.

Clause 8: The computer-implemented method of any of clauses 1-7, wherein generating the cryptogram comprises digitally signing the at least one transaction message with the at least one issuer key.

Clause 9: The computer-implemented method of any of clauses 1-8, wherein the client device comprises a merchant application and an electronic wallet application, wherein the merchant application receives the at least one identifier for the at least one product to be purchased and detects the checkout action with the client device, and wherein the electronic wallet application generates the at least one transaction message and generates the cryptogram, the method further comprising sending, with the merchant application, an initial transaction message to the electronic wallet application, wherein the at least one transaction message is generated based at least partially on the initial transaction message.

Clause 10: A system for conducting a secure payment transaction for a purchase at a merchant using a client device and a remote point-of-sale (POS) system associated with the merchant, the client device comprising at least one account identifier associated with at least one issuer institution and at least one issuer key associated with the at least one issuer institution, comprising: a client device comprising at least one processor, the client device programmed or configured to: receive at least one identifier for at least one product to be purchased, the at least one product associated with a transaction value; detect a checkout action; in response to detecting the checkout action, generate at least one transaction message based on the transaction value of the at least one product to be purchased and the at least one account identifier; generate a cryptogram based at least partially on the at least one transaction message and the at least one issuer key; and transmit the cryptogram to the remote POS system associated with the merchant.

Clause 11: The system of clause 10, wherein the client device comprises at least one of a mobile device executing an electronic wallet application and a smart shopping cart system.

Clause 12: The system of clause 10 or 11, wherein the client device comprises the smart shopping cart system and the mobile device, the smart shopping cart system comprising at least one input device and at least one processor, the client device further programmed or configured to pair the smart shopping cart device with the mobile device.

Clause 13: The system of any of clauses 10-12, wherein the at least one processor of the smart shopping cart device is programmed or configured to receive the at least one identifier for the at least one product to be purchased by scanning, with the at least one input device, a data source associated with the at least one product.

Clause 14: The system of any of clauses 10-13, wherein the remote POS system comprises a virtual POS system unique to the merchant hosted in a network environment.

Clause 15: The system of any of clauses 10-14, wherein the checkout action comprises at least one of the following: exiting a geographic boundary, passing a sensor, selecting a checkout option in a mobile application, or any combination thereof.

Clause 16: The system of any of clauses 10-15, wherein the issuer key comprises at least one of a symmetric secret key and an asymmetric secret key.

Clause 17: The system of any of clauses 10-16, wherein the cryptogram is generated by digitally signing the at least one transaction message with the at least one issuer key.

Clause 18: The system of any of clauses 10-17, wherein the client device comprises a merchant application and an electronic wallet application, wherein the merchant application receives the at least one identifier for the at least one product to be purchased and detects the checkout action with the client device, and wherein the electronic wallet application generates the at least one transaction message and generates the cryptogram, and wherein the client device is further programmed or configured to transmit, with the merchant application, an initial transaction message to the electronic wallet application, the at least one transaction message based at least partially on the initial transaction message.

Clause 19: A computer program product for conducting a secure payment transaction for a purchase at a merchant using a client device and a remote point-of-sale (POS) system associated with the merchant, the client device comprising at least one account identifier associated with at least one issuer institution and at least one issuer key associated with the at least one issuer institution, comprising at least one non-transitory computer-readable medium comprising program instructions that, when executed by at least one processor of the client device, cause the client device to: receive at least one identifier for at least one product to be purchased, the at least one product associated with a transaction value; detect a checkout action; in response to detecting the checkout action, generate at least one transaction message based on the transaction value of the at least one product to be purchased and the at least one account identifier; generate a cryptogram based at least partially on the at least one transaction message and the at least one issuer key;

and transmit the cryptogram to the remote POS system associated with the merchant.

Clause 20: The computer program product of clause 19, wherein the client device comprises a mobile device executing the electronic wallet application and a smart shopping cart system, the smart shopping cart system comprising at least one input device and at least one processor, and wherein the program instructions, when executed by the at least one processor, further cause at least one of the mobile device and the smart shopping cart system to: pair the smart shopping cart device with the mobile device; scan, with the at least one input device, a data source associated with the at least one product; and determine the at least one identifier for the at least one product to be purchased from the data source.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
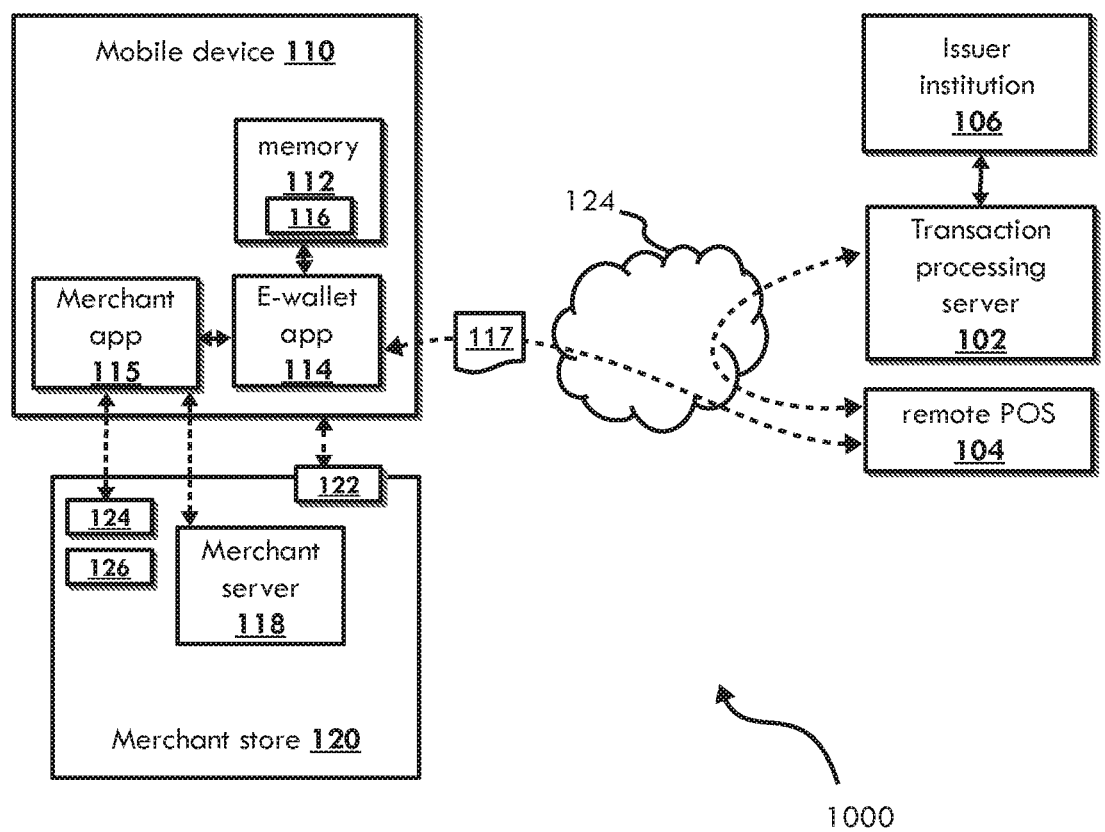
FIG. 1 is a schematic diagram for a system for conducting a secure payment transaction using a remote point-of-sale (POS) system according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present disclosure are directed to a system, method, and computer program product for conducting a secure payment transaction using a remote point-of-sale (POS) system. In particular, non-limiting embodiments of the disclosure allow for a "Card-Present" transaction to be performed at a physical merchant store (e.g., a brick-and-mortar retail establishment) without using or requiring a physical POS system local to the merchant store by generating a cryptogram on a mobile device based at least partially on one or more issuer secret keys and transmitting the cryptogram to a remote POS system. Non-limiting embodiments of the present disclosure provide for a technologically improved secure transaction system that eliminates the need for merchants to have a physical POS infrastructure at their merchant stores in order to conduct a Card-Present transaction. By generating a cryptogram on a mobile device at the merchant store and conducting the transaction through a remote POS system, rather than a local, physical POS system at the merchant store, merchants can conduct payment transactions without requiring customers to checkout at a physical POS system, avoiding lines and making the shopping experience more enjoyable for customers. Moreover, arranging the merchant POS system as a remote POS system solves a problem caused by existing mobile device payment systems which do not permit a customer to initiate a payment transaction by exiting a geographic boundary, such as a region associated with a merchant store, or passing through a sensor while exiting the merchant store.

As used herein, the term "issuer institution" may refer to one or more entities, such as a bank, that provide accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment card, and/or may be electronic and used for electronic payments. As used herein, the term "account identifier" may include one or more PANs, tokens, or other identifiers associated with a customer account. An account identifier may be directly or indirectly associated with an issuer, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The term "product," as used herein, refers to one or more goods and/or services. A "point-of-sale (POS) system," as used herein, may refer to one or more computers and/or peripheral devices used by a merchant to engage in payment transactions with customers, including one or more magnetic stripe card readers, chip card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, a "remote POS system" may refer to a POS system hosted in a network environment. A remote POS system may be hosted on one or more computers instead of, or in addition to, a physical POS system located at a merchant. A remote POS system may be hosted in or external to the premises of the merchant. As an example, a remote POS system may be a virtual POS system hosted in a cloud-computing environment (e.g., a cloud POS system). The remote POS system may be unique to a specific merchant and may be hosted by the merchant, by a transaction service provider, by an issuer institution, or by a third party.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., a watch, glasses, lenses, clothing, and/or the like), a personal digital assistant (PDA), and/or other like devices. As used herein, the term "client device" may refer to, as an example, a mobile device, a smart shopping card system as described herein, and/or a smart appliance as described herein.

As used herein, the term "electronic wallet" refers to one or more electronic devices and/or software applications that are configured to initiate and/or conduct payment transactions. An electronic wallet may include an electronic wallet application that is executed by a mobile device operated by a customer, and may further include server-side software and databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank may be an electronic wallet provider.

Referring now to FIG. 1, a system 1000 for conducting a secure payment transaction using a remote POS system is shown according to some non-limiting embodiments. A mobile device 110 includes a merchant application 115, an electronic wallet application 114, and memory 112, among other hardware and software components. An issuer key 116 is stored on the memory 112. The issuer key 116 may include one or more symmetric and/or asymmetric key values associated with a transaction account and provisioned by an issuer instruction. The issuer key 116 may be unique for the customer and/or account identifier. In some examples, the issuer key 116 may be directly or indirectly associated with an issuer institution. The mobile device 110 is in communication with a network environment 124, such as the internet, a private network, and/or the like, and through the network 124 the mobile device 110 communicates with a remote POS system 104. The remote POS system 104 may be in communication with a transaction processing server 102 through the network 124 or in some other manner, and the transaction processing server may be in communication with an issuer institution 106.

With continued reference to FIG. 1, the mobile device 110 may be used to conduct a transaction in a merchant store 120. The merchant store 120 may include a physical retail store, service provider, or any other merchant premises at which a customer can purchase goods and/or services. The merchant store 120 may include a merchant server 118, checkout sensor 122, and one or more data sources 124, 126 associated with one or more products. The data sources 124, 126 may include, for example, one or more RFID transponders, barcodes, indicia, and/or other like devices for storing data. The data sources 124, 126 may each include a product identifier to uniquely identify a good or service available for purchase at the merchant store 120. The product identifier may be associated with other product information in a database, such as price, currency, expiration date, special instructions, and/or the like, which may be retrieved by the merchant application 115 based on the product identifier. In some examples, product information may be stored on the data sources 124, 126 along with the product identifier.

Still referring to FIG. 1, a user operating the mobile device 110 may enter the merchant store 120 and execute a merchant application 115 on the mobile device 110. The merchant application 115 may be used to scan data sources 124, 126 with a camera or transceiver (NFC, Bluetooth®, RFID, and/or the like) and extract a product identifier and/or other product information from the data sources 124, 126. Alternatively, sensors on the products and/or cameras arranged in the store 120 may identify products picked up by customers. In such circumstances, a merchant server 118 may communicate with the merchant application 115 over the internet, a local area network, or the like, and provide product information to the merchant application 115 based on the detected activity of the user within the merchant store 120.

Still referring to FIG. 1, the merchant application 115 may maintain a list of products selected by a customer and a total cost of those products. It will be appreciated that, in other non-limiting embodiments, instead of a merchant application 115, an electronic wallet application 114, web browser application, remote application (e.g., a merchant application available as Software-as-a-Service), and/or other like applications and systems may be used to receive product identifiers and maintain a list of products selected by the customer. When the customer exits the merchant store 120, the customer may pass through or in proximity to a checkout sensor 122. The checkout sensor 122 may include any sensor capable of sensing the customer's mobile device 110, such as a Bluetooth® transceiver, NFC transceiver, RFID transceiver, and/or the like. It will be appreciated that, in addition to the checkout sensor 122, any device or system may be used to detect that the customer has exited or is exiting the merchant store 120. For example, one or more cameras may be used to recognize a customer when he or she enters the merchant store 120, and may likewise recognize the customer when he or she exits the merchant store 120 through a designated exit. In some non-limiting embodiments, the geolocation of the mobile device 110, as determined by signal triangulation, GPS systems, and/or the like, may be used to determine when the customer operating the mobile device 110 exits the merchant store 120.

With continued reference to FIG. 1, in response to detecting a checkout action, such as determining that the customer has exited or is exiting the merchant store 120, the mobile device 110 communicates with the remote POS system 104 to conduct the transaction for the products purchased by the customer. As used herein, the term "checkout action" refers to an action taken by a customer to initiate a purchase. For example, a checkout action may be a customer exiting a merchant store 120, passing a checkout sensor 122, choosing a checkout option through the merchant application 115 or electronic wallet application 114, and/or the like. In response to detecting a checkout action, the merchant application 115 may transmit transaction data, such as the transaction value (e.g., total purchase price including price, tax, application of discounts, and/or other values), individual prices for each product, and/or other product information, to an electronic wallet application 114 executing on the mobile device 120.

In some examples, the merchant application 115 may prompt a customer to choose an electronic wallet application 114 or another method of payment. The merchant application 115 and/or electronic wallet application 114 may further prompt the user to select a specific account with which to conduct the transaction.

The merchant application 115 may also transmit remote POS system data as part of the transaction data, such as an identifier, address, and/or credential for the remote POS system, to the electronic wallet application 114. The remote POS system data may also be made available in an indexed database such that a corresponding remote POS system can be identified by the merchant application and/or the electronic wallet application. In response to the electronic wallet application 114 receiving the transaction data, the electronic wallet application 114 may generate a transaction message based on one or more transaction parameters from the transaction data, such as the transaction amount, the account identifier associated with the account used by the customer to make the purchase, an application transaction count (e.g., a counter value incremented by each transaction conducted by the customer with the electronic wallet application 114 and/or with a particular account identifier), a transaction code, a merchant identifier (e.g., a unique merchant identifier, a merchant name, a merchant location, and/or the like), and/or other relevant information. The application transaction count may ensure that a transaction message and resulting cryptogram is unique for each transaction, even for two identical purchases by the same customer.

In non-limiting embodiments, and still referring to FIG. 1, once the transaction message is generated, the mobile device 110 digitally signs the transaction message with one or more issuer keys 116 stored in memory 112 on the mobile device 110 to generate a cryptogram 117. The issuer key 116 may include one or more secret symmetric keys and one or more asymmetric keys. The symmetric key may be, for example, a card key that is stored on a security chip arranged on or in a physical payment card issued to the customer for the same account. The asymmetric key may be a public key and a corresponding private key. In embodiments in which the issuer key 116 comprises both symmetric and asymmetric keys, the symmetric key may be used to encrypt the transaction message using any known method such as, for example, the Triple Data Encryption Standard (3DES), the Advanced Encryption Standard (AES), and/or any other like symmetric encryption algorithms. The resulting encrypted transaction message may then be digitally signed with an asymmetric key, such as a private key associated with a corresponding public key, to generate a cryptogram 117. The transaction message may be digitally signed with the asymmetric key using any known method such as, for example, the RSA algorithm, Elliptic Curve Crytography (ECC) algorithms, Elliptic Curve Crytography Digital Signature (ECDSA) algorithms, and/or the like. It will be appreciated that, in some non-limiting embodiments, the cryptogram may be generated based on one or more keys, including one or more symmetric keys and asymmetric keys, associated with a transaction processing entity or other entity instead of or in addition to one or more issuer keys.

The cryptogram 117 may be inserted into the transaction message as an additional field in the message, although it will be appreciated that the cryptogram 117 may also be separate from the transaction message. In other examples, the unencrypted transaction message may be digitally signed with the private key to generate a cryptogram 117, and the cryptogram 117 may be inserted into the transaction message to be encrypted with the symmetric key. It will be appreciated that various other implementations are possible. The asymmetric key (e.g., at least part of the public/private key pair) may also be included in the transaction message or, in other examples, be transmitted separately such that the remote POS 104 can verify the transaction message based on the asymmetric key. In some examples, a card certificate may be transmitted which includes a PAN, an expiration date, a public key, a digital signature generated by the issuer private key, and/or other like account information. In non-limiting embodiments, the cryptogram 117 may be 16-bytes, although it will be appreciated that the cryptogram 117 may be various sizes. Moreover, it will also be appreciated by those skilled in the art that the cryptogram 117 may be generated by digitally signing or otherwise processing the transaction message with a single issuer key or multiple issuer keys.

In FIG. 1, the electronic wallet application 114 transmits the transaction message including the cryptogram 117, or a transaction message and a separate cryptogram 117, to the remote POS system 104. The asymmetric key may also be transmitted to the remote POS system 104 as part of the transaction message or separately. After the remote POS system 104 receives the transaction message, it transmits the transaction message (along with the cryptogram 117 and asymmetric key if not already part of the transaction message) to the transaction processing server 102 which, in turn, identifies an issuer institution that corresponds to the account identifier used by the customer to conduct the transaction. In response, the transaction processing server 102 transmits the transaction message (along with the cryptogram and asymmetric keys if not already part of the transaction message) to the issuer institution that was identified.

Still referring to FIG. 1, in response to receiving the transaction message, the issuer institution 106 identifies the symmetric key based on the account identifier. For example, the issuer institution may be in communication with a database (not shown in FIG. 1) that corresponds account identifiers, such as but not limited to PANs, with issuer keys. Once the transaction message is decrypted using the symmetric key corresponding to the account identifier, the issuer institution 106 generates a new cryptogram based on the transaction message and asymmetric key and compares the new, regenerated cryptogram to the cryptogram 117 that was previously generated and transmitted by the mobile device 110. If the new cryptogram and original cryptogram 117 are determined to match, the issuer institution 106 verifies and completes the transaction with the transaction processing server 102 which will, in response, transmit a confirmation to the remote POS system 104. The remote POS system 104, in response to receiving the confirmation, may then transmit a confirmation to the electronic wallet application 114 to complete the transaction.

Figure 2:
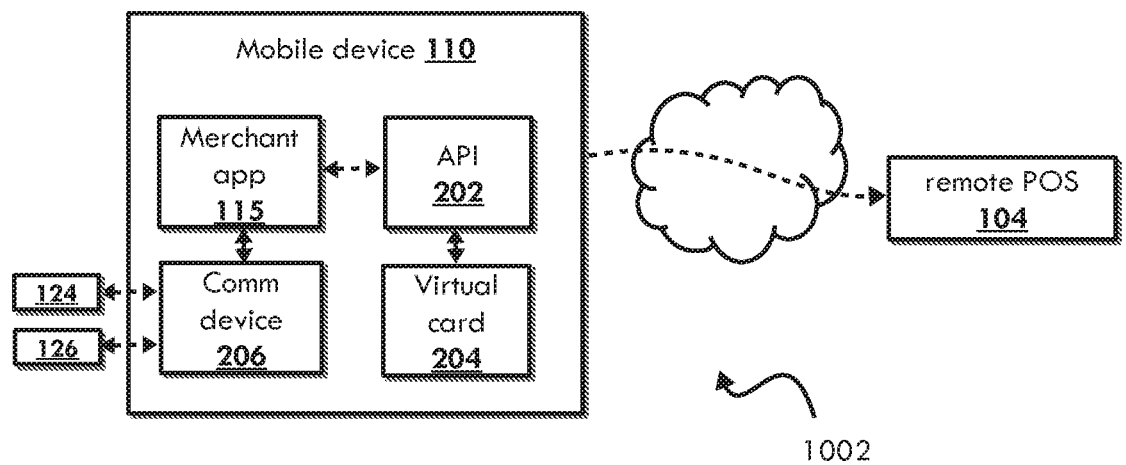
FIG. 2 is another schematic diagram for a system for conducting a secure payment transaction using a remote POS system according to the principles of the present disclosure.

Referring now to FIG. 2, a system 1002 for conducting a secure payment transaction using a remote POS system is shown according to some non-limiting embodiments. The system shown in FIG. 2 illustrates further components of the mobile device 110 used by a customer to initiate a transaction with a remote POS system 104. The mobile device 110 includes a merchant application 115, a communication device 206, a virtual card 204, and an application programming interface (API) 202 to facilitate communication between the merchant application 115 and the virtual card 204. The merchant application 115 may be developed using one or more software development kits (SDKs) to interface with the virtual card 204. The virtual card 204 may include, for example, secure data representing one or more portable financial devices such as a credit card. The virtual card 204 may be in the form of one or more data structures and/or software applications and include one or more account identifiers, tokens, security codes, Card Verification Values (CVV), expiration dates, customer names, issuer bank identifiers, issuer bank secret keys, and/or any other information associated with a financial transaction account. The virtual card, in some non-limiting examples, may be part of an electronic wallet application.

With continued reference to FIG. 2, the mobile device 110 also includes a communication device 206, such as a near-field communication (NFC) transceiver, RFID transceiver, and/or other contactless transceivers or receivers. The communication device 206 may also include any other device for receiving data from a data source 124, 126, such as but not limited to a camera. In operation, a user of the mobile device 110 enters a merchant store and scans the data sources 124, 126 with the mobile device 110. The communication device 206 receives data from the data sources 124, 126, such as product identifiers and other product information. The merchant application 115 then adds the product to a list while the customer shops. When the customer exits the store or otherwise indicates that he or she wishes to checkout and initiate the purchase of the products obtained in the merchant store, the mobile device 110 generates a transaction message and a cryptogram based on the virtual card 204 and the transaction data from the merchant application 115. The transaction message and cryptogram may be generated by an electronic wallet application (not shown in FIG. 2), a server-side application in communication with the mobile device 110, or the merchant application 115, as examples. The transaction is then conducted between the mobile device 110 and the remote POS system 104.

Figure 3:
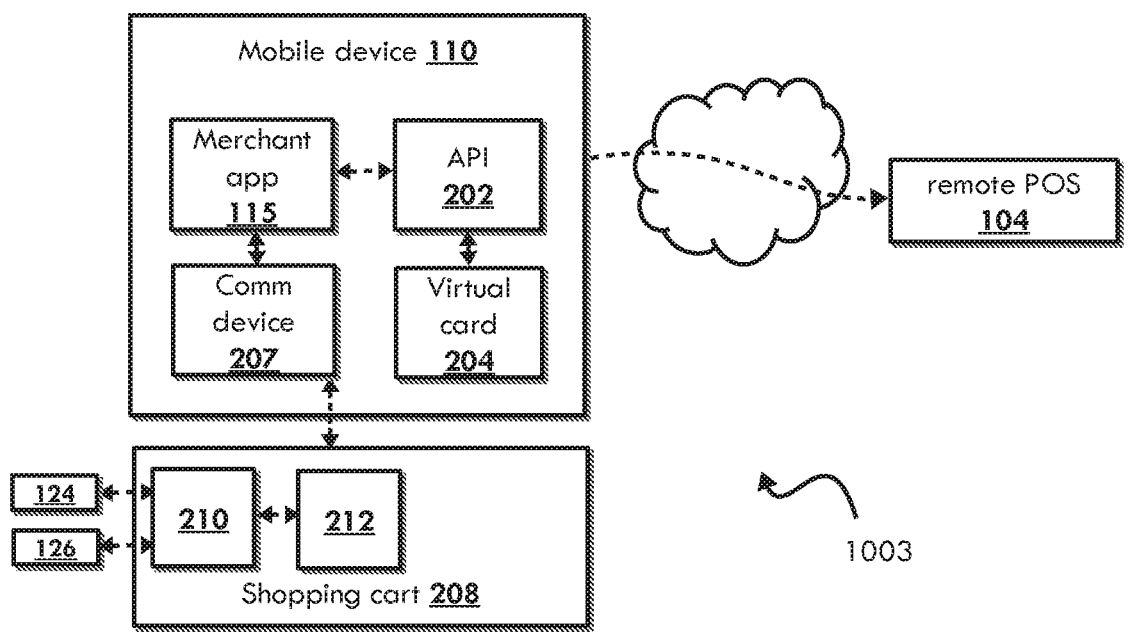
FIG. 3 is a further schematic diagram for a system for conducting a secure payment transaction using a remote POS system according to the principles of the present disclosure.

Referring now to FIG. 3, a system 1003 for conducting a secure payment transaction using a remote POS system is shown according to some non-limiting embodiments. A communication device 207 of the mobile device 110 shown in FIG. 3 may not be able to receive data from the data sources 124, 126. For example, the communication device 207 may be a Bluetooth® transceiver and the data sources 124, 125 may be RFID transponders. The communication device 207 may also include a Universal Serial Bus (USB) port, an audio port, and/or any other communication device 207 for allowing communication between the mobile device 110 and an external system or device. In the embodiment shown in FIG. 3, a shopping cart system 208 is in communication with the communication device 207 of the mobile device 110. The shopping cart system 208 may include a physical shopping cart, a processor 212, one or more communication devices 210, memory, and/or other components. A communication device 210 of the shopping cart may receive product data from the data sources 124, 126 such that the shopping cart system can provide this information to the mobile device 110.

With continued reference to FIG. 3, the merchant application 115 may be used to establish communication with the shopping cart system 208. For example, upon entering a merchant store, a customer may execute the merchant application 115 and use the merchant application to pair the mobile device 110 to an available shopping cart system 208 and unlock the shopping cart system 208 for use. The mobile device 110 and shopping cart system 208 may be wirelessly connected and/or physically connected via a cable and/or docking station. A docking station may provide power to the mobile device through one or more batteries arranged in the shopping cart system and/or by a generator powered by motion of the cart. In some examples, the mobile device 110 and/or merchant application 115 may provide customer identification data to the shopping cart system 208, which may use that data to target advertisements to the customer, provide loyalty account information, provide discounts and incentives, provide personalized communication with the customer, and/or the like. Once the customer pairs the mobile device 110 to the shopping cart system 208, the customer may then begin shopping in the merchant store. The communication device 210 of the shopping cart system may be used to retrieve data from the data sources 124, 126 when the corresponding products are placed into the shopping cart.

Still referring to FIG. 3, the communication device 210 may be one or more antennae arranged to scan the contents of the shopping cart to identify one or more products. For example, an RFID transceiver may use an arrangement of one or more dimensional RFID antennae to periodically interrogate the contents of the shopping cart for passive RFID transponders. In other examples, the communication device 210 may scan for products in response to detecting that a new item has been placed in the shopping cart, using motion or gravimetric sensors. In further examples, the communication device 210 may be a barcode reader or camera that is used to scan one- or two-dimensional barcodes on various products. Further, in some examples, one or more cameras arranged in the shopping cart may automatically capture images or video of the items being placed in the cart and the processor 212 and/or a remote server in communication with the processor 212 may use one or more image recognition algorithms to identify the products that have been placed in the shopping cart 208. Additionally or alternatively, one or more cameras may be arranged in the merchant store as explained above. The cameras in the merchant store may be in communication with one or more merchant servers that provide product data to the shopping cart system 208.

With continued reference to FIG. 3, in response to detecting a checkout action, the merchant application 115 may receive product data from the shopping cart system 208. The merchant application 115 and/or an electronic wallet application may then interface with the virtual card 204 to generate a transaction message and cryptogram. As an example, upon detecting a checkout action, the merchant application 115 may call an electronic wallet application via one or more APIs 202 to provide transaction data including the received product data, remote POS system data, and/or the like, to the electronic wallet application. The transaction message and cryptogram may then be generated as described herein. It will be appreciated that in embodiments in which a shopping cart system 208 is used, the shopping cart system 208 may include one or more display devices and input devices and perform the functions described herein as being performed by the mobile device 110. For example, the shopping cart system 208 may include the merchant application 115. Various other arrangements are possible.

It will be appreciated that one or more sensors, communication devices 210 arranged in the shopping cart, cameras arranged in the merchant store, and/or the like may be used to delete products from an ongoing list of selected products if those products are removed from the shopping cart. In some examples a customer may be prevented from deleting products through the mobile device 110. The merchant application 115 may prevent the deletion of products as a default setting or prevent deletion in response to detecting a connection between the mobile device 110 and the shopping cart system 208.

Figure 4:
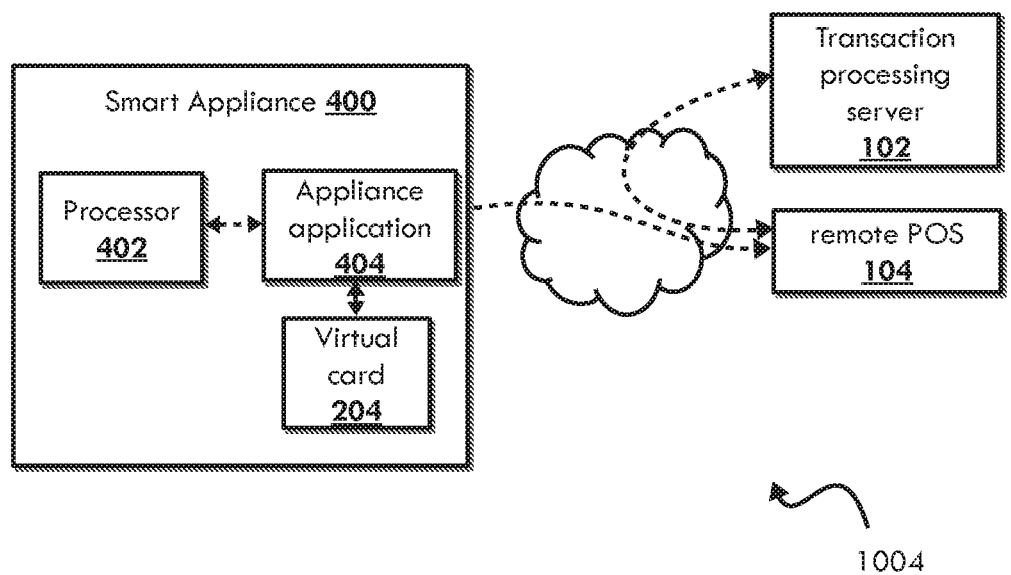
FIG. 4 is a further schematic diagram for a system for conducting a secure payment transaction using a remote POS system according to the principles of the present disclosure.

Referring now to FIG. 4, a system 1004 for conducting a secure payment transaction using a remote POS system is shown according to a some non-limiting embodiments. The system 1004 in FIG. 4 includes a smart appliance 400, such as a network-capable and software-driven refrigerator, television, washing machine, coffee maker, thermostat, and/or the like. The smart appliance 400 may be provisioned with a virtual card 204 including an issuer key for conducting Card-Present transactions with a remote POS system 104. The smart appliance 400 may include a processor 402 and one or more appliance applications 404. The appliance applications 404 may include a merchant application, an electronic wallet application, and/or any other software applications executable by the processor 402 of the smart appliance 400.

Still referring to FIG. 4, in an example where the smart appliance 400 is a refrigerator, the processor 402 may determine that a particular product (e.g., orange juice) is depleted. The processor 402 may execute an appliance application 404 to connect to a merchant and to receive product availability and price information for replacement orange juice. The smart appliance 400 may be configured to use a designated merchant for all purchases or for purchases of a particular type of product. In other examples, the smart appliance 400 may assess multiple merchants to determine the preferred merchant based on price, shipment time, availability, and/or any other parameter. The smart appliance may then, either through its operating system or one or more appliance applications 404, initiate a transaction by generating a transaction message and cryptogram based on data received from the virtual card 204, including an issuer key. In further examples, the smart appliance 400 may be a television and the appliance application 404 may be an on-demand video streaming application. The virtual card 204 may be used to conduct Card-Present transactions for purchasing and/or renting videos. In still further examples, the smart appliance 400 may be an ordering button for automatically initiating a predefined transaction in response to being actuated. Various other purchases are possible with other smart appliances.

Figure 5:
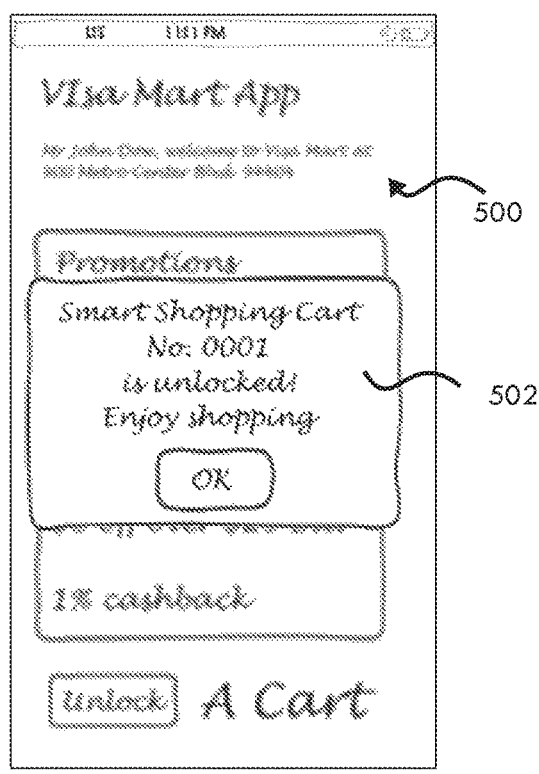
FIG. 5 is a graphical user interface for a system for conducting a secure payment transaction using a remote POS system according to the principles of the present disclosure.

Referring now to FIGS. 5-8, graphical user interfaces (GUIs) are shown according to preferred and non-limiting embodiments. Although the GUIs of FIGS. 5-8 are shown on a mobile phone, it will be appreciated that the GUIs may be adapted for and displayed on any mobile device or display screen, including one or more display devices of a shopping cart system. FIG. 5 illustrates a GUI 500 for a merchant application including a confirmation 502 that a shopping cart system has been unlocked for use. The confirmation 502 also identifies the shopping cart system (e.g., "No. 0001") for the customer to use. As described herein, the merchant application may be used to pair the mobile device to the shopping cart system. One or more additional GUIs may provide selectable options to choose a specific shopping cart, establish communication between the mobile device and the shopping cart system, and/or other like options. The term "selectable option," as used herein, refers to one or more buttons, radio buttons, checkboxes, links, drop-down menus, text boxes, icons, and/or the like.

Figure 6:
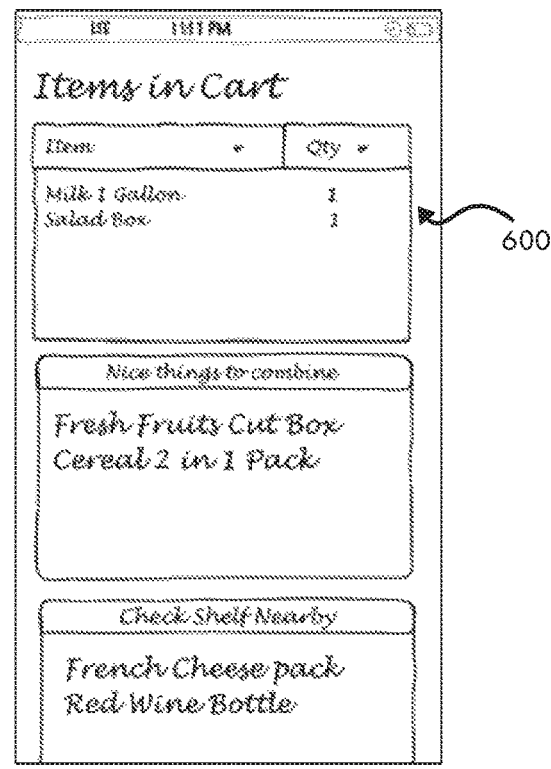
FIG. 6 is another graphical user interface for a system for conducting a secure payment transaction using a remote POS system according to the principles of the present disclosure.

FIG. 6 illustrates a shopping list GUI 600 for a merchant application according to some non-limiting embodiments. The shopping list GUI 600 may include a list of products, with corresponding product information, that have been placed in the shopping cart, scanned with the mobile device, or otherwise selected by the customer. As shown in FIG. 6, the shopping list GUI 600 may display a list of products that have already been selected by the customer in addition to recommendations, promotions, coupons, advertisements, directions to nearby products, and/or other commercial information or information about the merchant store that may be dynamically generated based on the identification of the customer, based on the customer's product selections, based on an indoor geolocation of the customer within the merchant store, and/or other like parameters.

Figure 7:
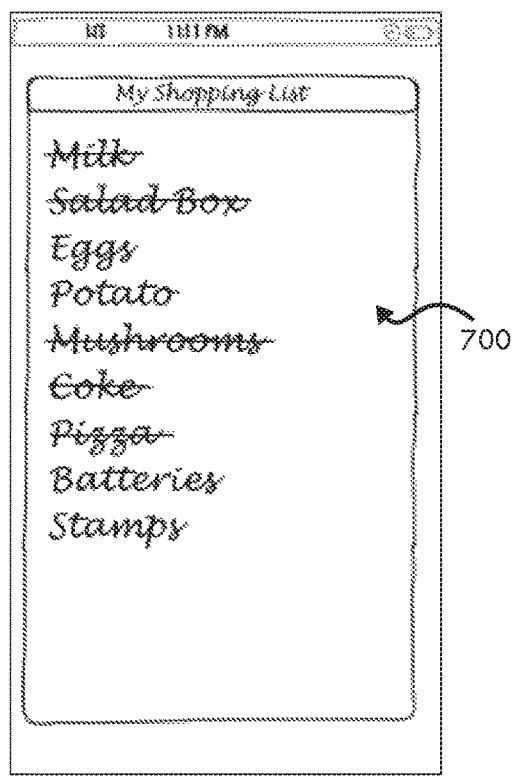
FIG. 7 is further graphical user interface for a system for conducting a secure payment transaction using a remote POS system according to the principles of the present disclosure.

FIG. 7 illustrates a target shopping list GUI 700 for a merchant application according to some non-limiting embodiments. The target shopping list GUI 700 may display a target shopping list of products that the customer wishes to purchase, which may be automatically removed, checked, struck through, or otherwise marked as those products are placed in the shopping cart, scanned, or otherwise selected by the customer. The target shopping list may be inputted by the customer into the merchant application and/or may be imported from a third-party application.

Figure 8:
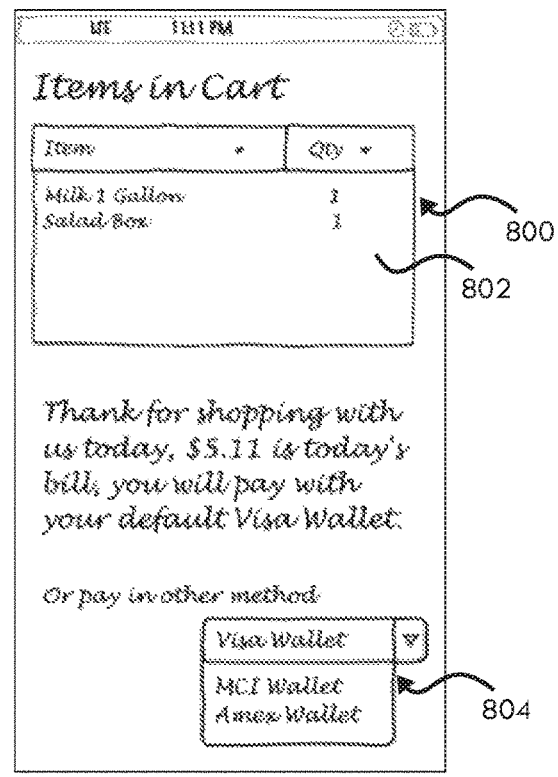
FIG. 8 is a further graphical user interface for a system for conducting a secure payment transaction using a remote POS system according to the principles of the present disclosure.

FIG. 8 illustrates a checkout GUI 800 for a merchant application according to some non-limiting embodiments. The checkout GUI 800 may be displayed by the merchant application in response to detecting a checkout action. The checkout GUI 800 includes a product list 802 showing all of the products that were placed in the shopping cart, scanned, or otherwise selected by the customer. The checkout GUI 800 also includes a selectable option 804 for selecting an electronic wallet to conduct the transaction. Upon selection of the selectable option 804, the mobile device may communicate with an electronic wallet application that corresponds to the user's selection. It will be appreciated that various other selectable options may be available for selecting different payment methods and/or the like.

Figure 9:
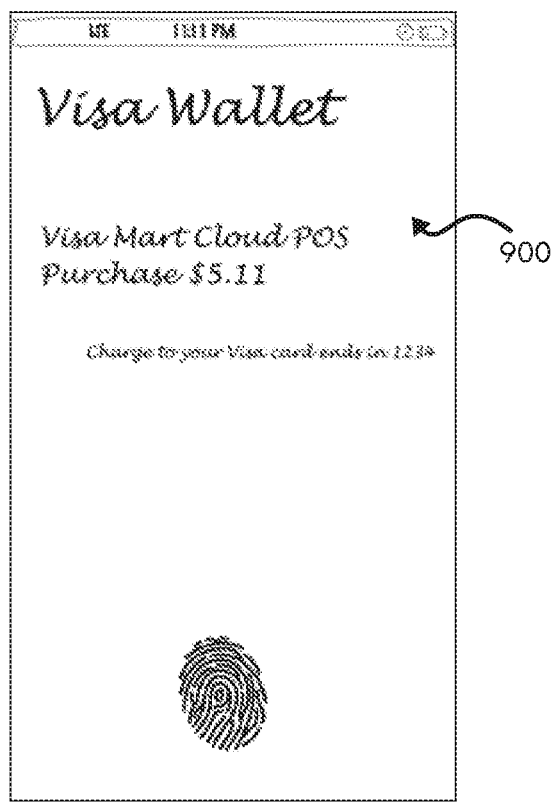
FIG. 9 is a further graphical user interface for a system for conducting a secure payment transaction using a remote POS system according to the principles of the present disclosure.

FIG. 9 illustrates a checkout confirmation GUI 900 for an electronic wallet application according to some non-limiting embodiments. The checkout confirmation GUI 900 may be displayed in response to the electronic wallet application receiving purchase data from the merchant application. The checkout confirmation GUI 900 prompts the user for input to confirm the transaction. In the example GUI 900 shown in FIG. 9, a user can use a fingerprint reader on the mobile device to authenticate himself or herself. It will be appreciated that any other authentication and/or confirmation mechanism may be used, such as a password, pin, voice recognition, other biometrics, and/or the like. In response to receiving user input confirming the transaction and/or authenticating the user, the electronic wallet application may generate a transaction message and cryptogram as described herein.

Figure 10:
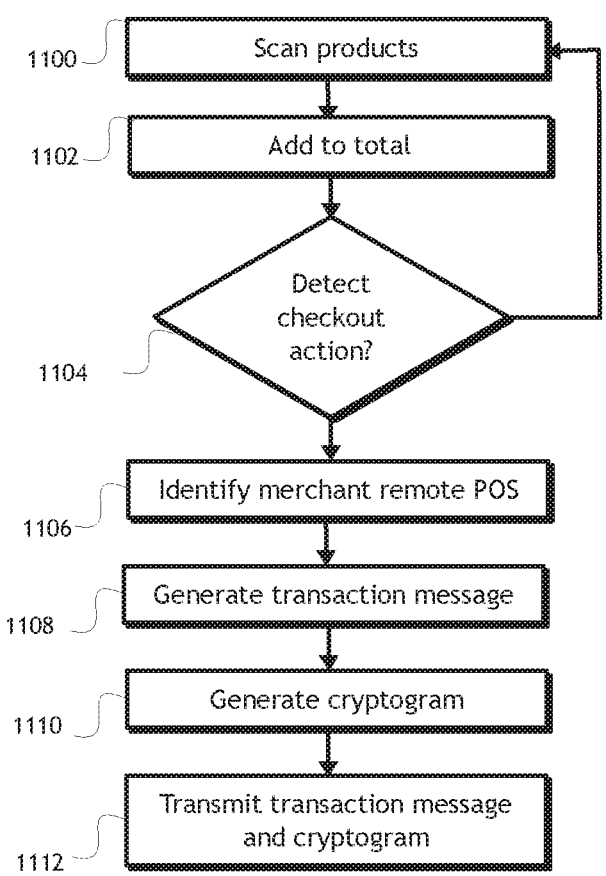
FIG. 10 is a step diagram for a method of conducting a secure payment transaction using a remote POS system according to the principles of the present disclosure.

Referring to FIG. 10, a step diagram is shown for a method for conducting a secure payment transaction using a remote POS system according to some non-limiting embodiments. It will be appreciated that the steps shown in FIG. 10 are for illustration only and that embodiments may use additional, fewer, or different steps than those displayed. At a first step 1100, the customer may scan products with a mobile device to obtain product data. The product price is added to a total transaction value at step 1102 by a merchant application on the mobile device. At step 1104, the mobile device and/or merchant application determines if a checkout action has occurred. For example, if the user chooses to check out on the merchant application or exits the merchant store or a geographic region associated with the merchant store, a checkout action may be detected and the method proceeds to step 1106. Otherwise, if there is no checkout action detected at step 1104, the method returns to step 1100 as the customer continues to shop and scan products.

Still referring to FIG. 10, in response to detecting a checkout action, a merchant remote POS system is identified at step 1106. The merchant remote POS system may be identified by the merchant application, by a merchant server or other communication device in the merchant store, and/or in any other like manner. At step 1108, a transaction message is generated based on the total transaction amount, transaction code, account identifier, and/or other like transaction data. At step 1110, a cryptogram is generated based on the transaction message generated in step 1108 and one or more issuer keys. At step 1112, the transaction message and cryptogram are transmitted to the remote POS system identified in step 1106. The cryptogram may be part of the transaction message or, in other examples, may be separate from the transaction message. It will be appreciated that other variations are possible.

Figure 11:
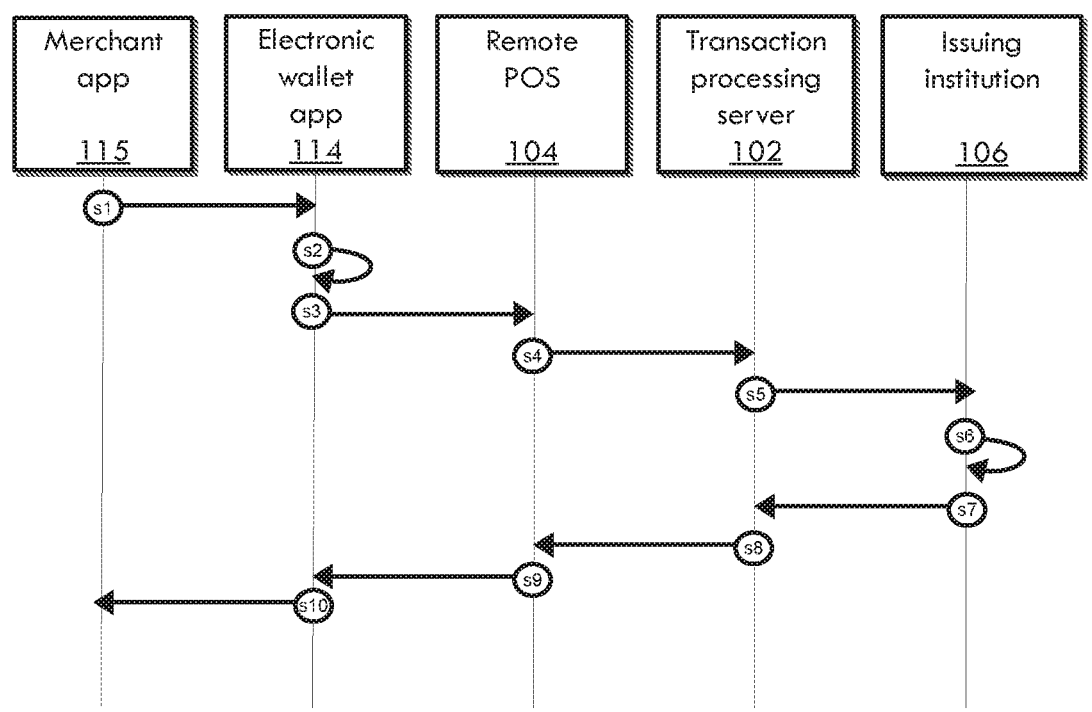
FIG. 11 is a transaction flow diagram for a system and method of conducting a secure payment transaction using a remote POS system according to the principles of the present disclosure.

Referring to FIG. 11, a transaction flow diagram is shown according to some non-limiting embodiments. It will be appreciated that the steps shown in FIG. 11 are for illustration only and that embodiments may use additional, fewer, or different steps than those displayed. Once a customer has used a merchant application 115 to shop for one or more products at a merchant store, the merchant application 115 communicates transaction data to the electronic wallet application 114 at step s1. As described herein, the transaction data may include product data, a total transaction amount, remote POS system data, and/or other like information. At step s2, the electronic wallet application 114 generates a transaction message and cryptogram. At step s3, the electronic wallet application 114 communicates the transaction message and cryptogram to the remote POS system 104. The remote POS system 104 communicates the transaction message and cryptogram to the transaction processing server 102 at step s4, and the transaction processing server 102 communicates the same to the issuer institution 106 at step s5.

With continued reference to FIG. 11, the issuer institution, at step s6, verifies the transaction by generating a new cryptogram based on the transaction message and an issuer key and compares the newly generated cryptogram to the originally received cryptogram. At step s7, the issuer institution transmits a confirmation or a rejection of the transaction. The transaction processing server 102 transmits a confirmation or a rejection of the transaction to the remote POS system 104 at step s8. In some examples, if the transaction is approved, the remote POS system 104 may communicate with one or more merchant servers at the merchant store to cause a security device on one or more products to be deactivated so that the customer can leave the merchant store with the products without activating a security alarm. Similarly, if the transaction is rejected, the remote POS system 104 may communicate with one or more merchant servers at the merchant store to alert or notify store personnel to stop the customer from leaving. In some examples, the remote POS system 104, in response to a rejection of a transaction, may cause a notification to be displayed on a customer's mobile device, may cause the doors of the merchant store to close or lock, or may cause any other action at the merchant store to inform the customer and/or store personnel that the products selected by the customer have not been paid for. At step s9, the remote POS system communicates a confirmation or rejection of the transaction to the electronic wallet application 114 which, in turn, may communicate the same to the merchant application 115 at step s10.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for conducting a secure payment transaction for a purchase at a merchant premises of a merchant using a client device and a remote point-of-sale (POS) system associated with the merchant that is external to the merchant premises, the client device comprising a smart shopping cart system and a mobile device including an account identifier associated with an issuer institution and at least one issuer key, used for authentication in a Card-Present transaction, which is provisioned by and corresponding to issuer institution, the method further comprising:
pairing, via near-field communication (NFC), the smart shopping cart system with the mobile device, the smart shopping cart system comprising at least one input device and at least one processor;
scanning, with the at least one input device, a data source associated with at least one product to be purchased;
determining, with the client device, at least one identifier for the at least one product to be purchased from the data source, each of the at least one product associated with a transaction value;
detecting a checkout action with the client device when the client device passes through a sensor while exiting the merchant premises to initiate the secure payment transaction;
in response to detecting the checkout action, generating, with the client device, at least one transaction message based at least partially on the transaction value of each of the at least one product to be purchased and the account identifier;
generating, with the client device, a cryptogram based at least partially on the at least one transaction message and the at least one issuer key by digitally signing the at least one transaction message with the at least one issuer key;
transmitting, with the client device, the cryptogram to the remote POS system associated with the merchant for transfer to the issuer institution by way of a transaction server;
verifying, at the issuer institution, the secure payment transaction by generating a second cryptogram based on the at least one transaction message and the at least one issuer key corresponding to the account identifier and matching the second cryptogram to the first cryptogram; and
sending, to the remote POS system, an approval of the secure payment transaction to cause deactivation of a security device on the at least one product to prevent activation of a security alarm when the client device exits the merchant premises.

2. The computer-implemented method of claim 1, wherein the remote POS system comprises a virtual POS system hosted in a network environment.

3. The computer-implemented method of claim 1, wherein each of the at least one issuer key comprises at least one of a symmetric secret key and an asymmetric secret key.

4. The computer-implemented method of claim 1, wherein the client device further comprises a merchant application and an electronic wallet application, wherein the merchant application receives the at least one identifier for the at least one product to be purchased and detects the checkout action with the client device, and wherein the electronic wallet application generates the at least one transaction message and generates the cryptogram, the method further comprising sending, with the merchant application, an initial transaction message to the electronic wallet application, wherein the at least one transaction message is generated based at least partially on the initial transaction message.

5. A system for conducting a secure payment transaction for a purchase at a merchant premises of a merchant using a client device and a remote point-of-sale (POS) system associated with the merchant that is external to the merchant premises, the client device comprising an account identifier associated with an issuer institution and at least one issuer key, used for authentication in a Card-Present transaction, which is provisioned by and corresponding to the issuer institution, the system comprising:
a client device comprising a mobile device and a smart shopping cart system, the client device configured to:
pair, via near-field communication (NFC), the smart shopping cart system with the mobile device, the smart shopping cart system comprising at least one input device and at least one processor;
scan, with the at least one input device, a data source associated with at least one product to be purchased;
determine, with the client device, at least one identifier for the at least one product to be purchased from the data source, each of the at least one product associated with a transaction value;
detect a checkout action when the client device passes through a sensor while exiting the merchant premises to initiate the secure payment transaction;
in response to detecting the checkout action, generate, with the mobile device, at least one transaction message based on the transaction value of each of the at least one product to be purchased and the account identifier;
generate, with the mobile device, a cryptogram based at least partially on the at least one transaction message and the at least one issuer key by digitally signing the at least one transaction message with the at least one issuer key; and
transmit the cryptogram to the remote POS system associated with the merchant for transfer to the issuer institution byway of a transaction server;
an issuer system associated with the issuer institution and comprising an issuer server, the issuer system configured to verify the secure payment transaction by generating a second cryptogram based on the at least one transaction message and the at least one issuer key corresponding to the account identifier and matching the second cryptogram to the first cryptogram; and
a security device adapted to be arranged on the at least one product, the security device configured to be deactivated in response to approval of the secure payment transaction to prevent activation of a security alarm when the client device exits the merchant premises.

6. The system of claim 5, wherein the remote POS system comprises a virtual POS system unique to the merchant hosted in a network environment.

7. The system of claim 5, wherein each of the at least one issuer key comprises at least one of a symmetric secret key and an asymmetric secret key.

8. The system of claim 5, wherein the client device further comprises a merchant application and an electronic wallet application, wherein the merchant application receives the at least one identifier for the at least one product to be purchased and detects the checkout action with the client device, and wherein the electronic wallet application generates the at least one transaction message and generates the cryptogram, and wherein the client device is further configured to transmit, with the merchant application, an initial transaction message to the electronic wallet application, the at least one transaction message based at least partially on the initial transaction message.

9. At least one non-transitory computer-readable medium for conducting a secure payment transaction for a purchase at a merchant premises of a merchant using a client device and a remote point-of-sale (POS) system associated with the merchant that is external to the merchant premises, the client device comprising an account identifier associated with an issuer institution and at least one issuer key, used for authentication in a Card-Present transaction, which is provisioned by and corresponding to the issuer institution, the at least one non-transitory computer-readable medium comprising program instructions that, when executed by at least one processor of the client device, perform operations comprising:

pairing, via near-field communication (NFC) by the at least one processor of the client device comprising a smart shopping cart system and a mobile device, the smart shopping cart system with the mobile device, the smart shopping cart system comprising at least one input device;

scanning, with the at least one input device, a data source associated with at least one product to be purchased;

determining, with the client device, at least one identifier for the at least one product to be purchased from the data source, each of the at least one product associated with a transaction value;

detecting a checkout action when the client device passes through a sensor while exiting the merchant premises to initiate the secure payment transaction;

in response to detecting the checkout action, generating, with the mobile device, at least one transaction message based on the transaction value of each of the at least one product to be purchased and the account identifier;

generating, with the mobile device, a cryptogram based at least partially on the at least one transaction message and the at least one issuer key by digitally signing the at least one transaction message with the at least one issuer key;

transmitting the cryptogram to the remote POS system associated with the merchant;

verifying, at the issuer institution, the secure payment transaction by generating a second cryptogram based on the at least one transaction message and the at least one issuer key corresponding to the account identifier and matching the second cryptogram to the first cryptogram; and sending, to the remote POS system, an approval of the secure payment transaction to cause deactivation of a security device on the at least one product to prevent activation of a security alarm when the client device exits the merchant premises.

* * * * *